United States Patent [19]
Nau et al.

[11] 3,779,452
[45] Dec. 18, 1973

[54] ROTARY SEPARATOR

[75] Inventors: Richard A. Nau, La Jolla; Sterling A. Campbell, San Diego, both of Calif.

[73] Assignee: General Dynamics Corporation, San Diego, Calif.

[22] Filed: Sept. 22, 1960

[21] Appl. No.: 57,742

[52] U.S. Cl................... 233/32, 233/11, 233/13, 233/18, 233/23, 233/32, 55/206, 55/337, 55/348
[51] Int. Cl............................................. B01d 45/12
[58] Field of Search............. 233/11, 12, 18, 21–23, 233/27; 183/2; 55/337, 206–207, 345–349

[56] References Cited
UNITED STATES PATENTS

| | | |
|---|---|---|
| 1,634,245 | 6/1927 | Jones .................................... 233/13 |
| 1,714,370 | 5/1929 | Humphrey ............................ 233/32 |
| 2,170,071 | 8/1939 | Furrer .................................. 233/11 |
| 2,551,815 | 5/1951 | Schulz .................................. 233/18 |
| 2,974,472 | 8/1960 | Skarstrom et al. ..................... 233/19 |

*Primary Examiner*—Reuben Epstein
*Attorney*—John R. Duncan

[57] ABSTRACT

The disclosed apparatus is for separation of mixed gases through the combined action of distillation and centrifugal force. A rotor rotates a separator which includes means for condensing from a gas the less volatile of the mixed gases. The separating means comprises a plurality of sieve trays arranged concentrically around the axis.

5 Claims, 6 Drawing Figures

INVENTORS
RICHARD A. NAU
STERLING A. CAMPBELL
BY
ATTORNEYS

INVENTORS
RICHARD A. NAU
STERLING A. CAMPBELL
BY
ATTORNEYS

ROTARY SEPARATOR

The present invention relates to a rotating separator, and more particularly to a rotating separator that separates mixed gases that differ in volatility. The invention is particularly adaptable for use where small, compact and light-weight distillation separators are desired; such as in aircraft or other space vehicles.

In the art of separating mixed gases, the separation units generally known are large and heavy. Often distillation separator columns used to separate, for example, nitrogen and oxygen in air, have a height exceeding 200 feet. Whether a single stage of separation is used — as shown in U.S. Pat. No. 683,492 — or a two stage separation is used — as shown in FIG. 3.6, page 83, of the book "Cryogenic Engineering", whose author is Russell B. Scott and which was published by Van Nostrand Co., Inc., 1959 Edition — the problem of obtaining purity of separation and volume output within commercial efficiencies has caused the known separators to be large in size. But, even with the very large sizes and with the plurality of stages, the volume output of known separators is relatively small. Thus, the aforesaid disadvantages of large size and relatively low output plus the inability of moving the separator while it is in operation without adverse effects, renders present-day separators unsuitable for use where it is desirable to have a small, compact and light-weight separator that is capable of large volume outputs and that may be moved during its operation.

It is therefore an object of this invention to provide a new and improved separator for separating mixed gases.

Another object of this invention is to provide a separator for separating mixed gases, which separator is small in size and light in weight.

It is another object of this invention to provide a separator for separating mixed gases that will operate equally well under reduced or varying gravitational forces.

Another object of the invention is to provide a small in size separator that is capable of separating mixed gases to a desired purity, and which separator is capable of providing a large volume output.

Another object of the invention is to provide a rotating separator that separates mixed gases by a distillation process, which gases have different volatilities.

The invention is directed to a rotating separator that is capable of separating mixed gases that have different volatilities. While the invention has general application in the separation of gases art, it is particularly adapted for use in aircraft or space vehicles; since the separator of the invention may be rotated during its operation without adverse effects, and still be light in weight and small in size. The invention involves the subjecting of cooled and pressurized air to controlled temperature and pressure conditions where the equilibrium of the mixed gases is unstable. In this unstable condition some of the gases will condense to a liquid while the remainder will remain in a vapor state. This distillation process occurs over a plurality of cascading stages in which the condensed liquid is serially boiled releasing the more volatile vapors, and the vapors are serially condensed liquifying the less volatile vapors, until the desired degree of separation is obtained. The distillation process is accomplished within a rotating unit that creates a very high centrifugal force for separating the liquid from the vapor, thus providing large output for small separator volume. The rotating unit is so constructed and arranged as to facilitate the separation of large volumes of mixed gases by a small and compact unit.

Further objects and advantages of our invention will become apparent as the following description proceeds, and the features of novelty which characterize our invention will be pointed out with particularity in the claims annexed to and forming a part of this specification.

For a better understanding of our invention, reference may be had to the accompanying drawings, of which:

Figure 1:
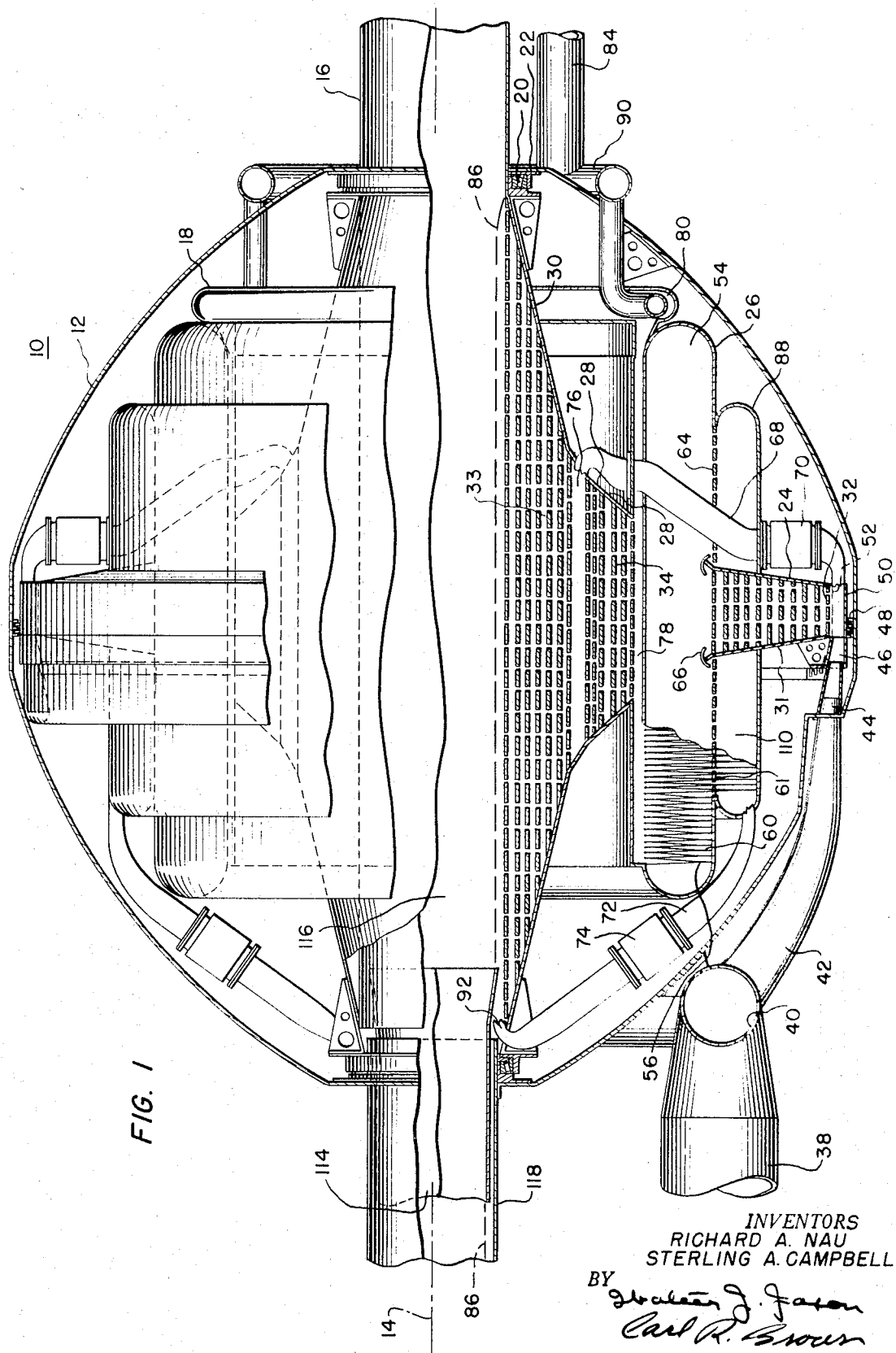
FIG. 1 shows a side view, partly in section, of a preferred embodiment of the invention.
Figure 2:
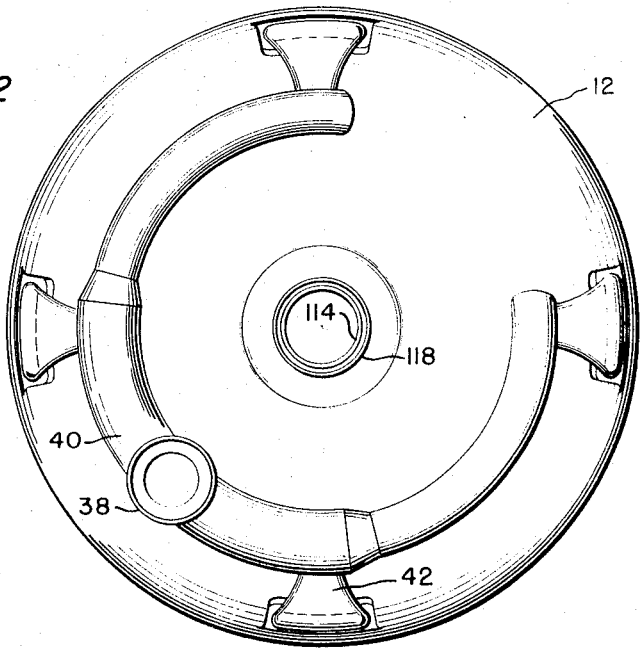
FIG. 2 is an end elevation of one end of the apparatus shown in FIG. 1.
Figure 3:
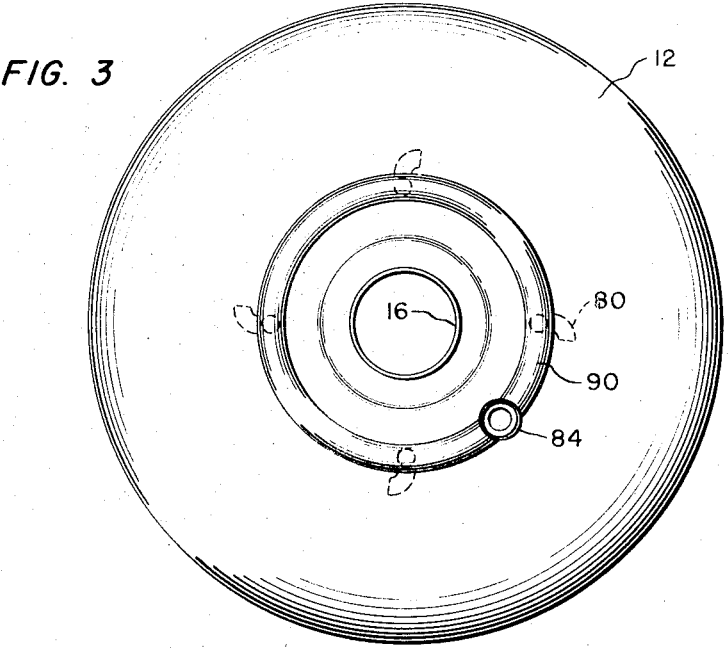
FIG. 3 is an end elevation of the opposite end of the apparatus shown in FIG. 1.

Referring now to the drawings, wherein like reference characters designate like or corresponding parts throughout the several views, there is shown in FIG. 1 a specific embodiment of a separator means 10 for separating the mixed gas, air, that may be in the form of vapor or mixed liquid and vapor, into its nitrogen and oxygen components. While the specific embodiment is directed to the separation of nitrogen and oxygen in air, the invention may be used for separating any mixtures of gases that differ in volatility. The separator 10 is shown having a housing 12 with a compact spherical shape. The housing 12 serves as a structural member for supporting portions of the separator and for enclosing the rotating unit 18. The housing may also function as a pressure containing member as will become more apparent hereinafter. Attached to housing 12 are output conduits 16, 114, and 24 that allow the separated nitrogen vapor and liquid oxygen to escape from the separator, and inlet conduits and manifolds 38, 40 and 42 that bring air vapor into the separator. The outer shell 12, along with the aforesaid conduits, is stationary with respect to the means for supporting the separator. A rotor means or rotating unit 18, positioned within and supported by housing 12, is free to rotate relative to the housing around axis 14 that passes through the center of rotor means 18. The rotor 18 is supported by housing 12 through bearing members 20 that rollably contact ring member 22 secured to housing 12.

Input air in the form of vapor or a liquid-vapor combination is compressed and cooled to a low temperature. This air vapor to be separated is carried by conduits and manifolds 38, 40 and 42 to nozzles 44 that direct the air vapor into impelling contact with turbine motor drive 46 that rotates rotor means 18.

The rotor means 18 contains separator means for separating the air vapor within an outer housing that includes a plurality of opposed circular shell members 24, 26, 28 and 30, interconnected to provide a pressure containing housing. Sections of separation in the separator means comprise a high pressure section 31, a condenser-reboiler section 54 and a low pressure section 33. The high and low pressure sections include distillation means arranged normal to the axis of rotation of said rotor. The distillation means includes a plurality of stages for cascading the effects of separate steps of evaporating and condensing the mixed gases thereby effecting their separation. The distillation stages comprise sets of cylindrical sieve tray members 32, 34 and 36 forming the respective sections of separation. Each cylindrical sieve tray is a hollow metal cylinder that may be made of titanium alloys or other suitable lightweight, non-corrosive material. While sieve trays are described herein for use as members in the distillation stages in the specific embodiment, it should be recognized that other types of trays may also be used — such as bubble cap trays or any of the several types of known packing arrangements.

Figure 5:
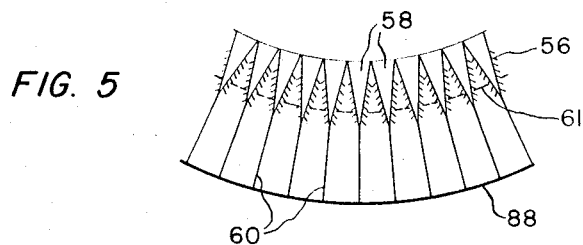
FIG. 5 is a partial cross sectional view of the condenser-reboiler section illustrating the arrangement of the conical members.

The sieve trays are secured to the respectively opposed shell members by welding or other suitable securing methods. The sieve tray cylinders are positioned concentrically with axis 14 and have lengths that decrease with the increase in the distance of the trays from axis 14. Each of the sieve trays has apertures therethrough that permit vapor to flow through the trays. The diameters of the apertures in the specific embodiment range from approximately 1/16 to 3/16 inch with the apertures covering approximately 30 percent of the cylinder's surface area. The condenser-reboiler section 54 includes a plurality of individual conical members 56 (see FIGS. 1, 5 and 6) arranged in a manner that the open portions of the conical members form the sump 78 of the low pressure section. The outer surface of the conical members 56 forms the condenser-reboiler section.

A plurality of conduit members 68 connect the collecting sump 50 of the high pressure separation section with one of the input spaces 76 of the low pressure separation section, and the plurality of conduit members 72 connect the collection sump 110 of the condenser-reboiler section with the reflux input 92 of the low pressure section. Pressure regulating and reducing valves 70 and 74 regulate the pressure relationship between the high and low pressure sections of the separator.

In operation the air vapor is injected into liquid 52 collected in the sump 50 of the high pressure section. The incoming air vapor, having a higher total heat factor, causes the liquid 52 to boil. This results in the vaporizing of a part of the more volatile nitrogen in liquid 52 and the concurrent condensing of a part of the less volatile oxygen in the incoming vapor, into liquid 52. Thus, nitrogen enriched air vapor moves in response to a pressure differential radially inward through sieve trays 32, while the oxygen enriched liquid 52 passes from sump 50 through conduit 68 to the low pressure section. The nitrogen enriched air, in passing through the apertures of the first sieve trays, contacts a fluid level on the radially inward side of the tray. The temperatures within the separator become colder in the direction toward the center of the rotor; so the nitrogen enriched vapor, having a higher heat content than the liquid on the tray, causes the liquid to boil, again vaporizing nitrogen in the liquid and condensing oxygen in the vapor. This distillation process occurs across each of the sieve trays 32, wherein the heat necessary to vaporize the nitrogen from the liquid is furnished by the condensation of the oxygen from the vapor; and the section of sieve trays act as an interchange apparatus, whereby the more volatile nitrogen is transferred from the liquid stream to the vapor stream.

The nitrogen vapor, upon reaching the condenser-reboiler section 54, has a temperature that exceeds the temperature of the liquid in sump 78. Thus, the liquid in sump 78 serves to cool the nitrogen vapor in the condenser-reboiler section through the conical members 56, and the warmer nitrogen vapor causes the liquid in sump 78 to boil, giving off nitrogen enriched vapor into the low pressure section in the manner that occurred in sump 50 of the high pressure section 31.

The condensed nitrogen that accumulates in the condenser-reboiler section 54 is used to directly reflux the high pressure section 31 and, through conduit 72, refluxes the low pressure section. The temperatures and pressures in the separator are maintained by a heat balance that results from the condensing of the oxygen and the evaporation of the nitrogen throughout the distillation stages. The refluxing of the sections by cold liquid nitrogen maintains the heat balance arrangement. The low pressure section has a lower temperature than the high pressure section because it has a lower pressure. The separated liquid oxygen that collects in sump 78 is moved from the separator by stationary scoops 80, while the vaporized nitrogen leaves the separator through conduit 16.

Other construction details and arrangements of the preferred embodiment of this invention will become more apparent in the following detailed description of the operation of the separator.

A source of air vapor is supplied from an air collection system (not shown) that compresses air to a desired pressure of approximately 400 pounds per square inch and cools the air to a low temperature. The air can be compressed by any suitable known arrangement, such as by ram compression in aircrafts, or by compressors or the like; and may be cooled to the desired temperature through a conventional heat exchanger that uses, for example, liquid hydrogen as the coolant. While the incoming air is normally a vapor, it can also be a saturated vapor or a liquid-vapor combination. The air is supplied to input conduit 38 and is then distributed by manifold 40 to individual conduit members 42 that direct the air from manifold 40 to the fixed nozzles 44. The air is then directed by the fixed nozzles 44 into impelling contact with the turbine blades 46 that drive in rotation the rotor 18. The normal drop in air pressure across the turbine blades 46 is that which is necessary to turn the rotor 18 to the desired speed and may be approximately 40 pounds per square inch. Thus, the air pressure entering the high pressure section may have a pressure per square inch of approximately 360 pounds. Labyrinth seals 48 maintain a pressure seal between the fixed housing 12 and the rotating turbine 46 and rotor 18. The desired pressure of the input air is dependent upon the other parameters of the separator including the output volume desired, degree of purity, size of separator, etc. Therefore, the actual pressures and temperatures that are given herein are not restrictive of the invention, but are to describe the preferred embodiment and to set forth the temperature and pressure relationships.

Figure 4:
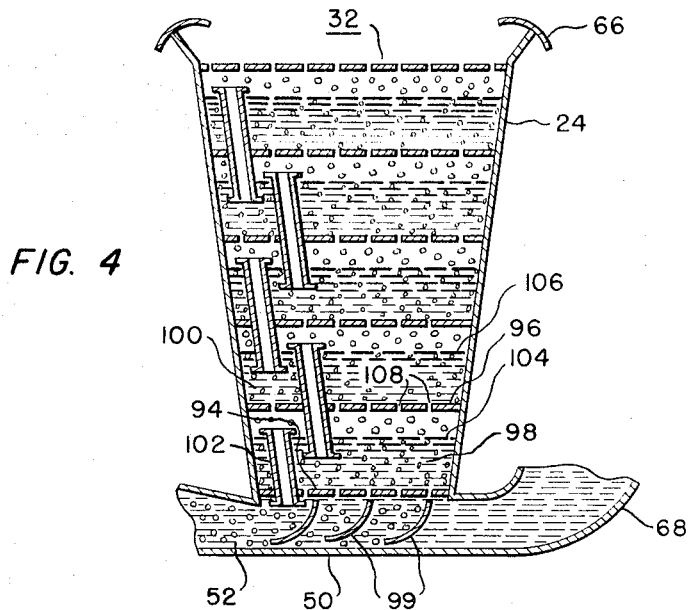
FIG. 4 is a partial sectional view of the high pressure separation section that illustrates the entry of the vapors to be separated and the distillation process that occurs across each stage.

The air vapor enters the high pressure section at the sump 50 of the high pressure section through a liquid 52 having a level as shown in FIGS. 1 and 4. Flow directors 99 tend to cause the air vapor to move upwardly and not directly through the conduit 68. Liquid 52 comprises oxygen enriched liquid air that has been condensed from the input air entering the separator, and from the vapor that moves radially inward through sieve trays 32 and is condensed on the sieve trays and is then forced to the sump 52 by the centrifugal force of the rotor. The centrifugal force resulting from the rotation of rotor 18 drives the condensed liquid radially outward from the center of the separator while the air vapor moves radially inward in response to a pressure and temperature differential that exists in that direction. The temperatures and pressures decrease across the radius of the rotor, thereby creating a decreasing temperature and pressure gradient across the plurality of distillation stages. This gradient permits the multistage distillation process that separates the air.

The air vapor entering sump 50 has a latent heat that exceeds the latent heat of the liquid 52 and thus causes the liquid 52 to boil. In boiling, the more volatile nitrogen in the liquid vaporizes and moves radially inward as a vapor. The vaporizing of the nitrogen in the liquid 52 absorbs heat from the liquid 52, that in turn absorbs heat from the incoming air vapor, tending to cause the less volatile oxygen in the air vapor to condense. This absorbing of heat by the nitrogen in vaporizing, and the releasing of heat by the oxygen in condensing, maintains the temperature balance of liquid 52. Of course, in the vaporizing and condensing processes, portions of oxygen vaporize with the nitrogen and portions of nitrogen condense with the oxygen; thus several stages of this distillation process must be cascaded to obtain the desired degree of separation of the vapors. This cascading occurs in the sieve trays.

The condensation in the input air vapor and that portion of the input air vapor that condenses through contact with the cooler liquid remain in the liquid 52. Since oxygen is less volatile than nitrogen, under the same temperature and pressure conditions, oxygen will condense and nitrogen will vaporize or remain a vapor. Thus, in liquid 52, a part of the oxygen in the incoming vapor will condense and remain in sump 50 because of the centrifugal force, while the major part of the nitrogen in the input air vapor will retain its vapor form and will join the nitrogen vaporized from liquid 52 in moving radially inward through the sieve trays 32. This enriches liquid 52 in oxygen.

The remaining air vapor that bubbles through liquid 52 (see FIG. 4) and proceeds through sieve trays 32 is rich in nitrogen, due to the initial loss of oxygen through condensing in liquid 52, and the concurrent vaporizing of liquid nitrogen in liquid 52. This nitrogen enriched air moves through the cylindrical sieve trays because of the pressure differential that exists across each tray. This pressure differential results from the decreasing temperature gradient and the condensing of nitrogen vapor in the connecting condenser-reboiler section 54.

The construction of the cylindrical sieve trays, and their arrangement and operation in separating the nitrogen and oxygen (see FIG. 4), is the same for all the groups 32, 34 and 36 of cylindrical sieve trays. The cylindrical sieve trays in the preferred embodiment are hollow cylinders having serially decreasing diameters such that they may be positioned concentrically. The trays have holes through the cylinders forming the sieve. The diameter of the holes may vary in the preferred embodiment from 1/16 inch to 3/16 inch. The sizes of the holes are given only for the purpose of describing the specific embodiment, it being recognized that the sizes may be varied within the scope of the invention.

Each of the individual cylindrical sieve trays has fluid resting on its radially inward surface, due to the centrifugal force that tends to force the liquid radially outward. While the sieve trays have apertures therethrough, the liquid is restricted from passing directly through the holes to sump 50 because of the vapor that is passing, under pressure, through the holes in a direction radially inward. Thus, the liquid level on each sieve tray, such as levels 104 and 106 in FIG. 4, raises, through the addition of new liquid by condensation of some of the vapor passing through, to the height of the downcomers 102.

As the nitrogen enriched vapor moves to the first cylindrical sieve tray 94, it passes through the holes 108 into the liquid 98 that rests on the radially inward side of the tray 94. The liquid, because of the decreasing temperature gradient, has a heat content that is lower than the vapor. This causes a condensing into the liquid of portions of the less volatile oxygen in the vapor and a boiling of the more volatile nitrogen in the liquid. Again, as in sump 50, this condensing of the oxygen in the vapor releases heat that in turn causes the more volatile nitrogen in the liquid on the sieve tray to vaporize and move to the next succeeding radially inward sieve tray 96; while the oxygen that condensed remains in the liquid 98 and, when the level increases sufficiently, moves through downcomers 102 to the next outwardly succeeding sieve tray or sump 52. It is thus apparent that the vapor moving to the next sieve tray 96 is further enriched in nitrogen. The vapor passes through the holes 108 and bubbles through the liquid 100 on the sieve tray 96. Again the temperature and pressure conditions in the liquid 100 are such that the oxygen in the vapor tends to condense and remain in the liquid 100, and the nitrogen in the liquid 100 tends to vaporize and pass on to the next sieve tray. The condensed oxygen remaining in the liquid 100 increases its level 106 on sieve tray 96 to a point that the liquid overflows and, because of the centrifugal force, passes into the liquid 98 on the next succeeding radially, outwardly positioned sieve tray 94. The high pressure separation section 33 thus accomplished a degree of separation wherein the incoming vapor is separated into oxygen enriched liquid and nitrogen enriched vapor.

The vapor leaving the last cylindrical sieve tray of sieve trays 32 boils out of the liquid level on the last tray having a high percentage of nitrogen, which, in the specific embodiment, approximates 96 percent. The nitrogen enriched vapor then enters the condenser-reboiler section 54 that condenses the vapor into liquid form for refluxing the high pressure section and for collection in sump 110. The inner wall of the conical members 58 forms a cylindrical pressure wall (see FIGS. 1 and 5) between the sump 78 of the low pressure section 33 and the condenser section 54. Thus, the inner surface of the conical members functions as the bottom of the sump 78 and the outer surface functions as the top of the condenser stage 52. Sump 78 collects the liquid oxygen condensed in the low pressure stage 112, which liquid oxygen has a pressure and temperature lower than the pressure and temperature of the vapor entering condenser-reboiler section 52. Accordingly, the liquid oxygen 61 in the conical members 54 cools the conical members that in turn cools the condenser-reboiler section. The conical members (see FIGS. 5 and 6) project radially outward with their points connected to the wall 88 of the sump 110 by wires 60. This forms a hoop arrangement within the condenser-reboiler section for strengthening the cylindrical wall 88 against the centrifugal force and pressure differential. In the specific embodiment, the centrifugal force, due to the rotation of rotor 18, causes a large force to be exerted outwardly on cylindrical member 88, because of the distance member 88 is from the center of rotation, the large liquid mass in sump 110, and the outwardly directed pressure differential that exists across member 88. These forces on member 88 are restricted by the connecting wires 60, since the pressure differential across the conical members at their open ends, next to sump 78, counteracts the pressure differential across cylindrical member 88.

Figure 6:
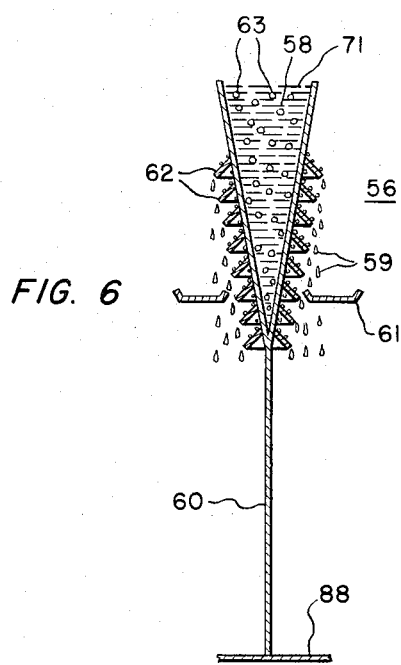
FIG. 6 is a sectional view of an individual conical member that illustrates schematically the evaporating and condensing processes.

The use of the conical shaped members also facilitates the transfer of heat from the warmer vapors in the condenser to the cooler liquid in sump 78. This heat transfer causes a boiling of the liquid 71 in the sump 78 that vaporizes the nitrogen 63 in the liquid 71 in the sump of the low pressure stage. As can be seen in FIG. 6, the nitrogen 63 bubbles as it vaporizes and passes upwardly and away from the slanting surface of the conical member, thereby removing nitrogen vapor 63 from the heat transfer surface and increasing the degree of heat transfer possible. Stripper ring members 62, that encircle the conical members, add to the heat conductive surfaces and also remove the condensed liquid 59 from the outer surface of the conical member, thereby also increasing the degree of heat conductivity possible.

As nitrogen enriched vapor condenses in the upper part of condenser-reboiler section, it moves outwardly under the centrifugal force of rotor 18, and collects on sieve tray 61. The liquid collecting on sieve tray 61 then flows over the rim of the high pressure section and refluxes the high pressure section. The remainder of the nitrogen enriched vapor that passes through sieve tray 61 into the lower part of the condenser-reboiler section, condenses and collects in sump 60. The liquid collecting in sump 60 passes through conduit 72 and pressure regulating valve 74 to reflux the high pressure section. The liquid on sieve tray 61, having been cooled below the temperature of the vapor entering the condenser-reboiler section, flows under director members 66 to add cooler liquid to the sieve trays 32. This refluxing maintains the heat balance within the liquid on the respective sieve trays in the high pressure section 31 and aids in maintaining the temperature gradient across the sieve trays 32.

The oxygen collected in sump 50 passes through conduit 68 and pressure regulator 70 to the receiving section 76 of the low pressure section. The general content of the liquid in sump 50 at this point is approximately 35 percent oxygen and 65 percent nitrogen. The content of the liquid condensing in the sump of the condenser-reboiler section is approximately 96 percent nitrogen and 4 percent oxygen. The liquid oxygen and nitrogen entering the low pressure section from conduit 68 are further separated by moving, under centrifugal force, radially outward through sieve trays 34 to the sump 78. The liquid in sump 78 is boiled to the extent that nitrogen and some oxygen are vaporized by the heat transfer occurring in condensing the vapor in the condenser-reboiler section. Thus, the section of cylindrical sieve trays 34 and 36 functions to substantially separate the remaining nitrogen from the liquid oxygen in the same manner as previously described in the high pressure section. The nitrogen enriched liquid passing through conduit 72 enters the upper portion of the low pressure section and serves to reflux the low pressure section.

The nitrogen enriched vapor that passes through, and is boiled out of, the liquid level on the sieve tray closest to the open cavity 116, enters cavity 116 and passes out either end of the rotor 18. The vapor escaping through conduit 16 is disposed of in any manner that may be desired. The nitrogen vapor escaping out conduit 114 passes through a separate external condenser (not shown) that condenses the nitrogen vapor into a cold reflux liquid that is returned to the low pressure stage through the outer conduit 118. If desired, the condenser, for liquifying the nitrogen vapor to be used to reflux the low pressure section, can be positioned within cavity 116 of rotor 18. In this arrangement, the coolant, such as cold hydrogen, could be passed through pipes located in the cavity. A part of the nitrogen vapor would still escape from the separator out of the conduit 16.

The liquid oxygen, having a desired purity of separation, that is collected in sump 78 moves with the rotor 18. A plurality of stationary scoops 80, that are attached to housing 12, receives the moving liquid oxygen. The force of the liquid drives the liquid out through output scoops 80 to output manifold 90, and then to output pipe 84. In the specific embodiment, the pressure in the low pressure stage is approximately 150 pounds per square inch. The pressure within housing 12 is also maintained at 150 pounds per square inch, so no packing is necessary around scoop 80, and the aforesaid pressure differential across cylindrical member 88 is reduced.

While we have shown and described a specific embodiment of our invention, other modifications will readily occur to those skilled in the art. We do not, therefore, desire our invention to be limited to the specific arrangement shown and described, and we intend in the appended claims to cover all modifications within the spirit and scope of our invention.

We claim:

1. In a separator for separating mixed gases by distillation which gases are capable of being liquified and differ in volatility, separator means for separating said mixed gases, rotor means for rotating said separator means around an axis, said separator means including a distillation means for condensing from a gas the less volatile of said mixed gases and evaporating from a liquid the more volatile of said mixed gases, said distillation means comprising a plurality of members arranged concentrically around said axis, said members being inter-connected at their edges to enclose said distillation means, the length of said members becoming progressively smaller as the radial distance of their position from said axis is increased, inlet means for receiving said mixed gases to be separated, said separator means having sump means at its radially outward extremities for collecting condensed portions of said separated gases, said rotor means having a center portion that communicates with said separator means for collecting separated portions of said mixed gases, and outlet means communicating with said sump means and said center portion for permitting said separated gases to escape from said separator.

2. In a separator for separating mixed gases by distillation which gases are capable of being liquified and differ in volatility, separator means for separating said mixed gases, rotor means for rotating said separator means around a given axis, said separator means including a high pressure separation section and a low pressure separation section and a condenser-reboiler section, said sections comprising a plurality of members concentrically arranged around said axis for forming a plurality of distillation stages, said members being enclosed by housings interconnected to substantially enclose said rotor means, said low pressure section being positioned adjacent to but spaced from said axis, said high pressure section being positioned radially outward from said low pressure section and said condenser-reboiler section being positioned in line with and between said pressure section and said high pressure section, said high pressure section communicating directly with said condenser-reboiler section and said condenser-reboiler section and said high pressure section being capable of communicating with said low pressure section through pressure regulating devices, inlet means for receiving input gases to be separated positioned adjacent the radially outward portion of said high pressure section and being capable of communicating with said high pressure section, turbine means for rotating said rotor means positioned in the path of said input gases and being driven by said gases, each of said sections having sump means positioned at the radially outward extremity of the respective sections for collecting portions of said gases distilled in said sections, said condenser-reboiler section comprising a plurality of open ended conical members with the open ends joined together in a manner that the inner surfaces of said conical members form the sump means of said low pressure section, the point ends of said conical members being connected by wire means to a radially outward positioned outer member that substantially forms the sump means of said condenser-reboiler section, said conical members having positioned on their outer surfaces thin ring members that project outwardly from said surfaces, scoop means being stationary relative to said rotor means for communicating with the sump means of said low pressure section for removing first separated portions of said mixed gases condensed in said sump means, the radially inward portion of said low pressure section directly communicating with the center of said rotor means, first conduit means communicating with said center of said rotor means for removing second portions of said separated gases from said separator, second conduit means communicating with said center portion of said rotor means for removing second portions of said separated gases from said separator and for returning to said low pressure section said gases in condensed liquid form to reflux said low pressure section, said sump means of said condenser-reboiler section communicating with said low pressure section for transferring a portion of said condensed liquid in said condenser-reboiler sump means to said high pressure section, and a stationary housing encompassing said rotor means for supporting said rotor means and for maintaining an inner pressure substantially equal to the pressure in said low pressure section.

3. In a separator for separating mixed gases by distillation which gases are capable of being liquefied and differ in volatility, rotor means including a plurality of separation sections for rotation around an axis, said sections comprising a low pressure section positioned adjacent to but spaced from said axis, a high pressure section spaced radially outward from said low pressure section and a condenser-reboiler section positioned between said low pressure section and said high pressure section, said low pressure section and said high pressure section including a plurality of cascading distillation stages for condensing from a gas the less volatile of said mixed gases into a liquid and for evaporating from a liquid the more volatile of said mixed gases into a gas, said distillation stages including a plurality of cylindrical members arranged concentrically around said axis, said cylindrical members being enclosed at their ends by housings joined together to substantially enclose said rotor means, the length of each of said cylindrical members becoming progressively smaller as the radial distance of their position from said axis is increased, each of said sections having a collecting sump at their respective radially outward extremities for collecting said condensed liquid, said condensed liquid maintaining a liquid level in each of said sumps, gas inlet means for injecting said mixed gases to be separated into said sump of said high pressure section, vanes positioned in said sump of said high pressure section for directing said gases through said liquid level toward said distillation stages of said high pressure section, said condenser-reboiler section comprising a plurality of conical members for providing heat exchange between said sump of said low pressure section and said condenser-reboiler section, said conical members having openings whose edges are joined together to form a pressure containing cylinder that encircles said low pressure section, the inner surface of said conical members forming the bottom surface of the sump of said low pressure section and the outer surface of said conical members forming the radially inward surface of said condenser-reboiler section, an outer member encircling said plurality of conical members, means for securing the radially outward projecting ends of said conical members to said outer member, ring means for projecting outwardly from and secured to said outer surface of said conical members for causing the condensed gases in said condenser-reboiler section to move away from said outer conical surface, said low pressure section adjacent to said center of said rotor means being open to communicate with said center, first conduit means communicating with said center of said rotor means for removing gases from said separator, second conduit means communicating with said center of said rotor means for removing gases from said separator and returning to said separator said gases in condensed form to reflux said low pressure section, means including a pressure regulating valve for transmitting liquid from said sump of said condenser-reboiler section to the portion of said low pressure section that communicates with said center of said rotor means to reflux said low pressure section, turbine means for rotating said rotor means, said turbine means being positioned in the path of said injecting gases and being driven by said gases, a stationary housing encompassing said rotor means for supporting said rotor means and for maintaining an inner pressure substantially equal to the pressure in said low pressure section, and scoop means secured to said stationary housing for removing separated portions of said mixed gases condensed in said sump means of said low pressure section.

4. In a separator for separating mixed gases in gas and liquid form by distillation which gases differ in volatility, separator means for separating said gases, rotor means for rotating said separator means around a given axis, said separator means comprising a pair of concentrically arranged pressure containing members for containing said portions of said mixed gases, one of said members being arranged around and spaced from said axis, the other of said members being positioned concentrically between said one member and said axis, said other member comprising substantially the inner surface of a plurality of conical members, said conical members having tapered ends projecting radially outward, structural means for connecting said tapered ends of said conical members to said one member, distillation means including a plurality of cascading distillation stages concentrically arranged around said rotor for serially boiling said liquid releasing more volatile vapors for movement in a radially inward direction and serially condensing said less volatile vapors for movement in a radially outward direction, a first portion of said distillation means being positioned between said other of said members and said axis, and a second portion of said distillation means being positioned between said other of said members and said one of said members.

5. In a separator for separating mixed gases in gas and liquid form by distillation which gases differ in volatility, separator means for separating said gases, rotor means for rotating said separator means around a given axis, said separator means comprising a pair of concentrically arranged pressure containing members for containing said portions of said mixed gases, one of said members being arranged around and spaced from said axis, the other of said members being positioned concentrically between said one member and said axis, said other member comprising substantially the inner surface of a plurality of conical members, said conical members having tapered ends projecting radially outward, structural means for connecting said tapered ends of said conical members to said one member, distillation means including a plurality of cascading distillation stages concentrically arranged around said rotor for serially boiling said liquid releasing more volatile vapors for movement in a radially inward direction and serially condensing said less volatile vapors for movement in a radially outward direction, a first portion of said distillation means being positioned between said other of said members and said axis, a second portion of said distillation means being positioned between said other of said members and said one of said members, said inner surface of said conical members forming the sump for the condensed liquid of said first portion, the outer surface of said conical members forming a condensing surface for said second portion, and said gas of said second portion causing said liquid of said first portion to boil in said inner surface.

* * * * *